United States Patent [19]

Sydansk

[11] Patent Number: 5,372,462
[45] Date of Patent: Dec. 13, 1994

[54] POLYMER ENHANCED FOAM FOR BLOCKING FLUID FLOW IN SOIL

[75] Inventor: Robert D. Sydansk, Littleton, Colo.

[73] Assignee: Marathon Oil Company, Findlay, Ohio

[21] Appl. No.: 161,840

[22] Filed: Dec. 1, 1993

Related U.S. Application Data

[63] Continuation-in-part of Ser. No. 22,703, Mar. 1, 1993, which is a continuation-in-part of Ser. No. 1,484, Jan. 7, 1993, Pat. No. 5,307,878.

[51] Int. Cl.$^5$ .................. E02D 3/12; E21B 33/138
[52] U.S. Cl. .................................... 405/264; 405/270; 166/294
[58] Field of Search ............ 405/264, 128, 263, 270; 166/294; 523/130, 131, 132; 106/197.2, 210, 205

[56] References Cited

U.S. PATENT DOCUMENTS

| | | | |
|---|---|---|---|
| Re. 32,114 | 4/1986 | Argabright et al. | 166/252 |
| 3,393,738 | 7/1968 | Bernard et al. | 166/300 |
| 3,894,131 | 7/1975 | Speech | 264/45.2 |
| 4,247,405 | 1/1981 | Weir | 252/8.554 |
| 4,291,069 | 9/1981 | Pilny | 405/264 |
| 4,300,861 | 11/1981 | Vartiak | 405/264 |
| 4,576,744 | 3/1986 | Edwards et al. | 252/554 |
| 4,612,332 | 9/1986 | Bock et al. | 521/65 |
| 4,676,316 | 6/1987 | Mitchell | 166/274 |
| 4,795,590 | 1/1989 | Kent et al. | 252/307 |
| 4,856,588 | 8/1989 | Borchardt | 166/273 |
| 5,002,431 | 3/1991 | Heymans et al. | 166/295 X |
| 5,125,770 | 6/1992 | Hesseling et al. | 405/264 X |
| 5,129,457 | 7/1992 | Sydansk | 166/274 |

Primary Examiner—Stephen J. Novosad
Attorney, Agent, or Firm—Jack L. Hummel; Jack E. Ebel

[57] ABSTRACT

A soil treatment process is provided utilizing a polymer enhanced foam to block the flow of a migratory fluid in a soil. Placement of the polymer enhanced foam in a desired treatment region of the soil produces a seal that substantially eliminates the permeability of the treatment region to the migratory fluid and prevents migration of fluid across the region. In each of its numerous embodiments, the process can be employed as either a remedial or a preventative treatment.

18 Claims, 2 Drawing Sheets

POLYMER ENHANCED FOAM FOR BLOCKING FLUID FLOW IN SOIL

This is a continuation-in-part patent application of prior copending patent application, U.S. Ser. No. 08/022,703, filed on Mar. 1, 1993, entitled "Polymer Enhanced Foam For Treating Gas Override Or Gas Channeling", which is a continuation-in-part patent application of patent application, U.S. Ser. No. 08/001,484, filed on Jan. 7, 1993, entitled "Polymer Enhanced Foams For Reducing Gas Coning", now U.S. Pat. No. 5,307,878.

BACKGROUND OF THE INVENTION

1. Technical Field

The present invention relates to a process for blocking fluid flow in a soil, and more particularly to a process for placing a polymer enhanced foam in a soil to eliminate the flow capacity of a soil to a migratory fluid.

2. Description of Related Art

The utility of foams, and particularly polymer enhanced foams, has been demonstrated in numerous hydrocarbon recovery applications. For example, U.S. Pat. No. 5,129,457 discloses the utility of a polymer enhanced foam as a displacement fluid for recovering oil retained in vertical fractures of a subterranean oil-bearing formation. The same patent also discloses the utility of the polymer enhanced foam as a mobility control fluid in fractured formations ahead of a gas drive fluid. U.S. Pat. No. 4,856,588 likewise recognizes the effectiveness of specific foam compositions as a mobility control fluid ahead of a drive fluid in oil recovery applications. U.S. Pat. No. 3,393,738 discloses the utility of a polymer enhanced foam generated in situ for controlling leakage of stored gas in a subterranean formation containing mobile water. The foam can also improve the displacement of the mobile water from the formation, thereby increasing the gas storage capacity of the formation.

The conventional oil field foams taught by the above-disclosed prior art references reduce the permeability of relatively deep subterranean formations to certain fluids, but are not deemed useful in soil sealing applications near the surface because the foams retain a degree of mobility in contact with flowing liquids, such as liquid drive fluids or formation water, which is undesirable for soil sealing applications. Concerns regarding the mobility of conventional oil field foams in soil, which is generally less consolidated and more porous than the geological material of hydrocarbon-bearing formations, suggest the ineffectiveness of oil field foams in soil sealing applications.

For example, foams utilized as water sealants for shallow subterranean structures and surrounding soils are commonly held to require more resistance to water flow and greater durability in the near-surface environment than provided by conventional oil field foams. As such, a need exists for compositions that can effectively block the flow of migratory fluids through soils in a wide range of near-surface applications. In particular, soil sealing composition are needed that are relatively immobile in the soil when subjected to the natural drift pressure of migratory liquids flowing through the soil.

U.S. Pat. No. 3,894,131 discloses a conventional high-strength durable crosslinked polymer foam for near-surface water sealing applications. Such crosslinked polymer foams, however, present the user with another set of problems not encountered when using conventional oil field foams. The crosslinking reaction of the water sealing foam adds a higher degree of operational complexity to proper placement of the foam. In addition, referral of the foam, if subsequent removal of the foam is desired from the treatment region, can be very difficult. Finally, and importantly, the precrosslinked composition of the foam contains organic solvents posing a high degree of risk when introduced into the environment. The use of such materials in or near water lines and other water containments is often precluded in today's stricter environmental regulatory climate.

Accordingly, it is an object of the present invention to provide a soil treatment process for blocking flow of a migratory fluid in a soil. It is another object of the present invention to provide such a soil treatment process that is economical and operationally uncomplex. It is also an object of the present invention to provide such a soil treatment process that utilizes an effective fluid blocking composition. It is further an object of the present invention to provide such a soil treatment process that utilizes an environmentally compatible fluid blocking composition.

SUMMARY OF THE INVENTION

The present invention is a soil treatment process utilizing a polymer enhanced foam to block the flow of a migratory fluid in a soil. Placement of the polymer enhanced foam in a desired volume of soil constituting the treatment region produces a seal that substantially eliminates the permeability of the treatment region at normal fluid drift pressures and prevents the migration of the fluid across the region. In each of its numerous embodiments set forth hereafter, the process can be employed as either a remedial or a preventative treatment.

In accordance with one embodiment, the process mitigates the effect of surface or subsurface leaks or spills of toxic, hazardous or otherwise undesirable fluids into soil, preventing the migration of such fluids through the soil into drinking water supplies or other water sources. In accordance with another embodiment, the process seals soil surrounding building structures, preventing the invasion of rainwater or groundwater into the structures. In accordance with yet another embodiment, the process provides linings under surface liquid containments preventing leakage of liquids from the containment into surrounding soil or underlying strata. In accordance with still another embodiment, the process provides a fluid impermeable barrier between topsoil and underlying subterranean strata. The barrier prevents the downward percolation of contaminated surface water or leachate into the underlying strata, prevents the upward migration of underlying alkaline aquifer water into the arable topsoil, or prevents the loss of rainwater or irrigation water from the arable topsoil to underlying strata.

The process, in each of its embodiments, comprises generation of the foam and placement of the foam in the desired treatment region. The foam is generated by initially forming an aqueous liquid solution of a polymer, a surfactant and an aqueous solvent. A gas is then added to the liquid solution, either before, after, or during injection of the solution into the soil. In any case, the resulting admixture of gas and aqueous solution is subjected to foaming conditions that generate the desired foam for placement in the treatment region.

Addition of the gas to the solution before injection of the solution into the soil generates a preformed foam at the surface before the foam enters the soil. Placement of the preformed foam in the soil is subsequently effectuated by injecting the foam into the soil via injection means and displacing the foam into the desired treatment region of the soil.

Addition of the gas to the solution in situ after injection of the solution into the soil generates the foam in situ, rendering foam placement substantially simultaneous with foam generation. Foam placement is effectuated by sequentially injecting the foam components into the soil via injection means, generating the foam from the foam components in situ upon entering the soil, and displacing the resulting foam into the desired treatment region of the soil.

Addition of the gas to the solution during injection of the solution into the soil is achieved by coinjection of the gas and solution into the soil. The foam is either generated in the injection means before the foam enters the soil or, alternatively, in situ after the foam components enter the soil. In either case, placement of the resulting foam is effectuated by displacement into the desired treatment region.

DESCRIPTION OF PREFERRED EMBODIMENTS

Figure 1A:
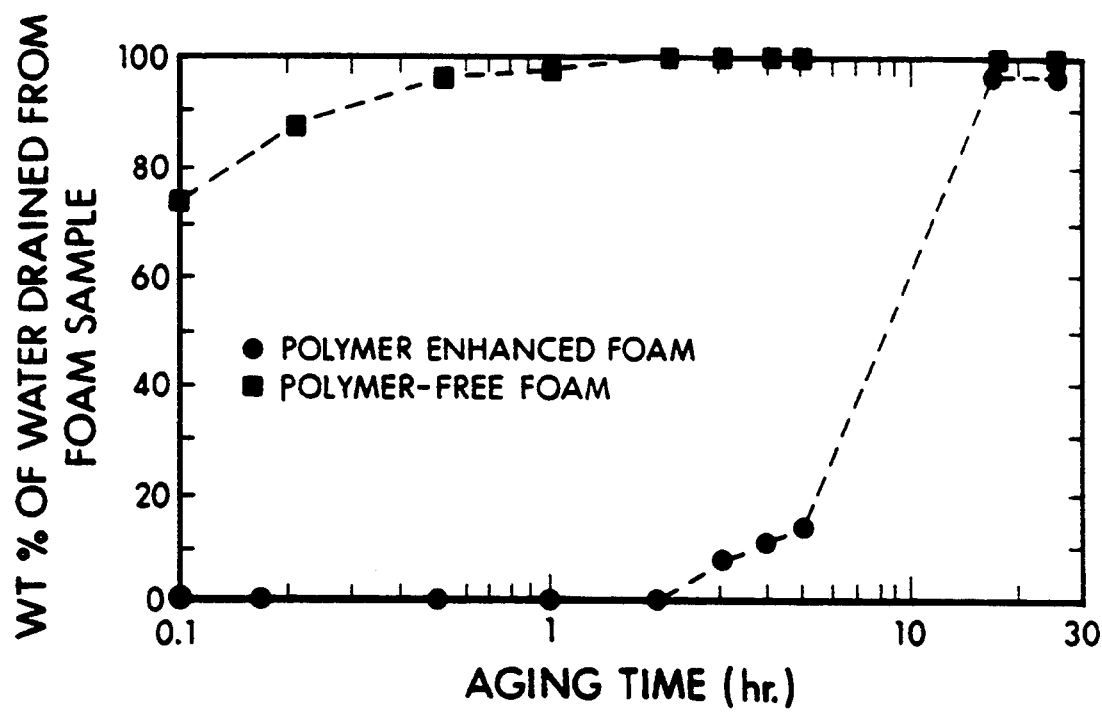
FIG. 1a is a graph comparing the rate of water drainage in a polymer enhanced foam of the present invention and a conventional polymer-free foam as described in Example 1.

A number of specific terms are used throughout the specification to describe the process of the present invention and are defined as follows. "Fluid flow capacity" is the degree to which porous media facilitates or, conversely, resists fluid flow. "Soil" is near-surface earthen geological material that is usually unconsolidated. "Soil", as used herein, can also be material contained in man-made earthen formations, such as dams, dikes, levees, and the like. "Strata" are any substantially horizontally disposed geological structures beneath the soil. The "foam" of the present invention is a stabilized gas dispersion maintained within a liquid phase, wherein the dispersed gas phase constitutes at least half of the total volume of the foam. The foam appears as a plurality of gas bubbles separated from one another by stabilized films of liquid. In porous media, such as soil, the foam may exist as discrete gas bubbles within the pore bodies of the porous medium. The bubbles are separated from one another by lamellae of interfacially stabilized liquid films.

Conventional foams consist of a gas dispersed in a surfactant solution made up of a surfactant and a solvent. The surfactant acts as a foaming agent to facilitate and stabilize the gas dispersion within the liquid phase. A "polymer enhanced foam" is a specific type of foam comprising a gas dispersed in an aqueous surfactant solution, wherein the aqueous surfactant solution further includes a polymer dissolved therein. Other terms used herein have the same definitions as ascribed to them in U.S. Pat. No. 5,129,457, incorporated herein by reference, or have definitions in accordance with the conventional usage of a skilled artisan, unless otherwise defined hereafter.

The process of the present invention is performed by generating and placing a polymer enhanced foam in a soil in the specific manner described hereafter. The polymer enhanced foam is generated from a substantially uncrosslinked polymer, an aqueous solvent, a surfactant and a gas. It is important to note that the foam composition is substantially free of any polymer crosslinking agent. By themselves, conventional polymer crosslinking agents are often potentially toxic to the environment. Furthermore, the presence of crosslinking agents with the polymers disclosed herein can undesirably crosslink the polymer and convert the liquid phase of the foam to a crosslinked polymer gel at some point in the process.

The polymer component of the foam is substantially any water-soluble, viscosity-enhancing polymer that is substantially uncrosslinked. Either a biopolymer or a synthetic polymer has utility herein. Examples of biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches.

Examples of synthetic polymers having utility herein include polyvinyl alcohol, polyethylene oxide, polyvinyl pyrrolidone, and acrylamide polymers. Exemplary acrylamide polymers are polyacrylamide, partially hydrolyzed polyacrylamide, and acrylamide copolymers, terpolymers and tetrapolymers, wherein acrylamide is one of the monomeric species of the polymer. Polyacrylamide (PA) is defined as an acrylamide homopolymer having substantially less than about 1% of its acrylamide groups converted to carboxylate groups. Partially hydrolyzed polyacrylamide (PHPA) is an acrylamide homopolymer having more than about 1%, but not 100%, of its acrylamide groups converted to carboxylate groups. Useful acrylamide polymers are prepared according to any conventional method, but preferably have the specific properties of an acrylamide polymer prepared according to the method disclosed in U.S. Pat. No. Re.32,114, incorporated herein by reference.

The average molecular weight of an acrylamide polymer having utility herein is generally in a range between about 10,000 and about 50,000,000, preferably between about 250,000 and about 20,000,000, and most preferably between about 1,000,000 and about 15,000,000. The polymer concentration in the liquid phase of the foam is generally at least about 500 ppm, preferably at least about 2,000 ppm, and most preferably within a range between about 3,000 ppm and about 10,000 ppm.

Polymers satisfying the criteria set forth above impart a high degree of stability to a polymer enhanced foam relative to conventional foams formulated from a gas and a liquid phase containing a surfactant, but lacking polymer enhancement. The polymer enhanced foam better retains its stability when contacted by certain migrating fluids within soil, such as liquid hydrocarbons, relative to conventional polymer-free foams that are readily destabilized by liquid hydrocarbon contact. Polymer enhancement of the foam also advantageously increases the structural strength and critical pressure gradient for flow of the foam relative to conventional polymer-free foams. The "critical pressure gradient for flow" is defined herein as the maximum pressure that can be applied to the foam without foam flow.

The aqueous solvent of the present polymer enhanced foam is substantially any aqueous liquid capable of forming a solution with the selected polymer. The term "solution" as used herein, in addition to true solutions, is intended to broadly encompass dispersions, emulsions, or any other homogeneous mixture of the polymer in the aqueous solvent. The solvent is preferably water, including either a fresh water or a brine.

The surfactant of the polymer enhanced foam is substantially any water-soluble foaming agent that is compatible with the specific polymer selected as will be evident to the skilled artisan. As such, the surfactant can be anionic, cationic or nonionic. A preferred surfactant is selected from the group consisting of ethoxylated alcohols, ethoxylated sulfates, refined sulfonates, petroleum sulfonates, and alpha olefin sulfonates. The concentration of surfactant in the liquid phase of the foam is in a range between about 20 ppm and about 50,000 ppm, preferably between about 50 ppm and about 20,000 ppm, and most preferably at least about 500 ppm. In general, the performance of the polymer enhanced foam in the method of the present invention is relatively insensitive to the particular species and concentration of the surfactant selected, subject to the above-recited criteria, particularly when the selected polymer is an acrylamide polymer.

Virtually any gas can be employed in the present polymer enhanced foam to the extent the gas is substantially chemically inert with respect to the other foam components and with respect to the foam generation or injection equipment. A preferred gas is one which is readily available. Such gases include nitrogen, air, flue gases and carbon dioxide. The quality of the polymer enhanced foam product, i.e., the volume percentage of gas in the foam, is typically within a range from about 50% to about 99%, and preferably within a range from about 60% to about 98%.

Foam generation requires mixing the liquid phase and the gas either at a high velocity or through a small orifice as can be provided by any conventional foam generator. The liquid phase is preferably preformulated by dissolving the surfactant and polymer in the aqueous solvent prior to foam generation. In one embodiment, the foam is generated at the surface before injection into the soil by passing the liquid phase and gas through a surface foam generator. The resulting preformed foam is then delivered to an injection means. Alternatively, the foam is generated during injection into the soil by coinjecting the gas and liquid phase across a surface injection tee acting as a foam generator, or coinjecting the gas and liquid phases via separate injectors into the soil, but passing them through a common subsurface foam generator before entering the soil.

The pH of the liquid phase in the polymer enhanced foam is generally within a range of about 4 to about 10, and preferably within a nearly neutral range of about 6 to about 8. In most cases, the pH of the liquid phase inherently falls within the above-recited range without any pH adjustment thereof. However, should the pH of the liquid phase be outside the desired range, the pH can be adjusted prior to or during foam generation to achieve a desired pH range. The pH adjustment can be made in any manner known to the skilled artisan. Nevertheless, it has been found that the present process is relatively insensitive to the pH of the liquid phase.

Placement of the polymer enhanced foam in a soil is preceded by injection of the foam components into the soil in accordance with one of the above-described sequences via conventional injection means penetrating the soil. Exemplary foam injection means is open-ended tubing having the open end positionable within a treatment region of the soil or capped tubing having perforations or slots formed in the tubing that are positionable across the treatment region. When the foam exits the injection means into the soil, placement is effectuated by displacing the foam throughout the desired treatment region with materials injected behind it, typically additional foam.

Placement of the foam is facilitated by the relatively high shear thinning properties of the polymer enhanced foam. The polymer enhanced foam exhibits relatively high viscosities when placed substantially beyond the injection point, but exhibits relatively low effective viscosities under the high flow rate, high pressure gradient for flow and high shear rate conditions encountered at or near the injection point during the injection step due to the ability of the foam to highly shear thin.

Thus, the high shear thinning ability of the foam results in relatively good injectivity of the foam into the soil with a minimum of injectivity reduction. Nevertheless, once the polymer enhanced foam is successfully placed in the soil, it beneficially shear thickens, thereby achieving a sufficient degree of structure. The associated relatively large critical pressure gradient for flow renders the polymer enhanced foam an effective sealant.

The character of the soil in which it is desired to place the foam can influence the selection of a specific foam composition. In general, placement of a foam in less permeable soil preferentially dictates selection of a foam having relatively limited structure, whereas a foam having a greater degree of structure can be selected for placement in more permeable soil. The degree of structure of the polymer enhanced foam formulated in the manner of the present invention is primarily a function of the polymer properties and polymer concentration.

In general, the degree of structure of a polymer enhanced foam containing an acrylamide polymer is increased by increasing the polymer concentration of the liquid phase. However, a more cost-effective and often preferred means for achieving the same effect is to employ a higher molecular weight polymer or, in some cases, a polymer having a higher degree of hydrolysis at a relatively fixed concentration. Conversely, a reduction in the degree of structure is achieved by using a lower molecular weight polymer or, in some cases, one having a lower degree of hydrolysis. Thus, the skilled practitioner can modify the degree of structure of the present polymer enhanced foam in the above-described manner to correspond with the permeability of the region of the soil in which the foam is to be placed.

As is apparent from above, the performance of the polymer enhanced foam as a sealant is a function of its critical pressure gradient for flow, which can alternatively be termed yield pressure. When fluids migrate through the soil, the fluids encounter a natural drift pressure gradient for fluid flow. It is necessary that the foam occupying the fluid flowpaths, through which the fluid must pass to flow, exhibits a critical pressure gradient for foam flow higher than the natural drift pressure gradient for flow of the fluid. By satisfying this criteria, the migratory fluid is unable to mobilize or displace the foam from the flowpaths. Consequently, the foam performs as an effective sealant in accordance with the present invention.

Relative to conventional polymer-free foams, the polymer enhanced foam is highly stable and resistant to flow. The polymer enhanced foam is stable over a wide range of temperatures, pressures, and water salinities and hardness. The polymer enhanced foam is also relatively stable, resisting foam collapse and fluid drainage in the presence of many environmental contaminants, including liquid hydrocarbons. The foam can be self healing so that if foam degradation occurs, the foam is capable of reforming itself as it begins to flow through the soil. Thus, placement of the foam in desired treatment regions of the soil provides long-term elimination of permeability to the natural drift of fluids, thereby substantially blocking the flow of migratory fluids through the treatment region when the foam is fully in place. The process is particularly applicable to the blockage of undesirable migratory liquids, such as water or liquid hydrocarbons. Nevertheless, the soil can be restored to its original condition, if desired, by injection of a conventional breaker into the treatment region to degrade the foam or polymer in situ.

Embodiments of the present process have been described above wherein, the polymer enhanced foam is generated prior to placement of the foam in the soil. However, other embodiments exist within the scope of the present invention, wherein the polymer enhanced foam is generated in situ simultaneous with placement of the foam in the soil. In one such embodiment, the liquid phase and gas are sequentially injected into the soil. The liquid phase preferably precedes the gas, enabling the higher-mobility trailing gas slug to overtake and finger through the leading liquid slug as the injected fluids are displaced into the soil. The restricted flowpaths of the soil act as a natural foam generator. As the gas and liquid phases pass through the pore throats of the soil the foam is generated. The volume of the liquid and gas slugs injected into the soil can be relatively small, but repetitive, to optimize utilization of the surfactant and formation of the foam in situ. In another similar embodiment, the liquid phase and gas are coinjected into the soil and the foam is generated in situ as the liquid phase and gas pass through the pore throats of the soil.

In the practice of the present invention, the polymer enhanced foam may be placed in a selected treatment region of the soil as either a remedial treatment after undesirable fluids have entered the soil or as a preventative treatment before undesirable fluids enter the soil. In accordance with one embodiment, the treatment region in which the foam is placed is a substantially vertical plane through the soil proximal to surface or subsurface leakage or spillage of toxic, hazardous or otherwise undesirable fluids. The foam occupying the treatment region forms a barrier to lateral fluid flow past the treatment region, thereby mitigating the effect of the leak or spill in adjoining soil. Thus, the present embodiment can be employed to prevent the migration of the undesirable fluids into drinking water supplies or other water sources, such as reservoirs, wells, rivers, lakes and the like, by placing the foam in a treatment region between the spill or leak site and the water source.

In a similar embodiment, the treatment region in which the foam is placed is a substantially horizontal plane through the soil beneath surface or subsurface leakage or spillage of toxic, hazardous or otherwise desirable fluids. The foam occupying the treatment region forms a barrier to downward fluid flow past the treatment region, thereby mitigating the effect of the leak or spill in underlying soil or strata. This embodiment can be employed to prevent the migration of the undesirable fluids into subterranean drinking water supplies or other water sources, such as aquifers, by placing the foam in a treatment region between the spill or leak site and the water source.

In another embodiment, the treatment region is a circumferential or underlying volume of soil surrounding a subterranean building structure, such as a basement or foundation. Placement of the foam in the treatment region forms a fluid impermeable barrier around the building structure preventing the invasion of rainwater or groundwater into the structure or the migration of the water into contact with the structure or adjacent water-sensitive soil, such as clay.

In accordance with yet another embodiment, the treatment region is a circumferential or underlying volume of soil surrounding a surface or subsurface, open or enclosed, liquid containment, such as an open waste pit, an irrigation ditch or an enclosed underground storage tank. Placement of the foam in the treatment region forms a fluid impermeable lining or blanket for the containment preventing leakage of liquids from the containment into surrounding soil or underlying strata.

In another embodiment, the treatment region is a substantially horizontal plane residing between topsoil and an underlying subterranean strata. The foam occupying the treatment region forms a barrier to either downward or upward fluid flow past the treatment region. The present embodiment can be employed to substantially prevent the downward percolation of contaminated surface water or leachate into the underlying strata. Alternatively, where the overlying topsoil is arable farmland, the present embodiment can be employed to substantially prevent the upward migration of underlying alkaline aquifer water into the topsoil, or to prevent the downward migration of rainwater or irrigation water from the arable topsoil to underlying strata. It is apparent to the skilled artisan from the instant disclosure that there are numerous other related applications within the scope of the present invention.

The following examples demonstrate the practice and utility of the present invention, but are not to be construed as limiting the scope thereof.

EXAMPLE 1

A sample of a polymer enhanced foam and a sample of a conventional polymer-free foam that is substantially identical in composition to the polymer component are prepared to compare the stability, and in particular the resistance to physical foam collapse and water drainage, of the two foams. The liquid phase of both foams is made up of a fresh water solvent containing 1000 ppm of a $C_{12-15}$ ethoxylated sulfate surfactant. The liquid phase of the polymer enhanced foam, however, is further enhanced with an unhydrolyzed polyacrylamide at a concentration of 7000 ppm. The molecular weight of the polymer is 11,000,000.

The foam samples are generated by coninjecting the liquid phase and a gas consisting of $N_2$ into a sandpack. The sandpack has a permeability of 67 darcies, a length of 30 cm and a diameter of 1.1 cm. All flooding is conducted at 170 kPa constant differential pressure across the sandpack. The polymer enhanced foam propagates at a frontal advance rate of 207 m/day and exhibits an average apparent effective viscosity within the sandpack of 89 cp, while the conventional foam propagates at a frontal advance rate of 8230 m/day and exhibits an average apparent effective viscosity of only 2 cp at the same differential pressure.

Figure 1B:
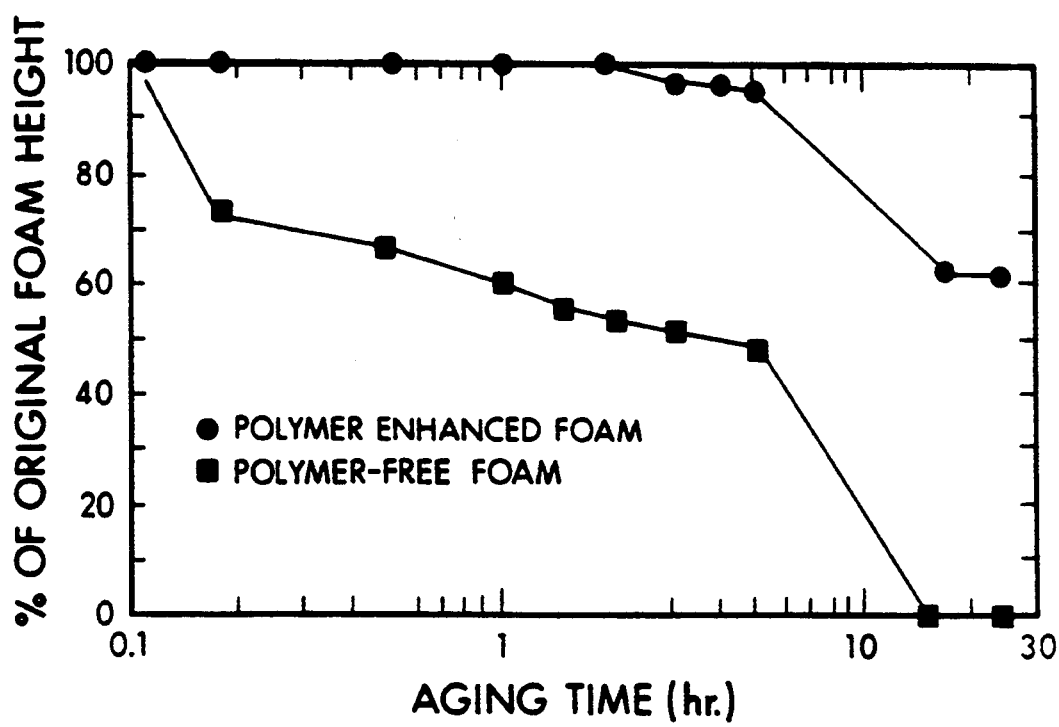
FIG. 1b is a graph comparing the rate of foam collapse in a polymer enhanced foam of the present invention and a conventional polymer-free foam as described in Example 1.

A 100 cm³ sample of each foam is collected as an effluent from the sandpack and placed in a stoppered graduated cylinder for aging at ambient temperature. The position of the foam/water and foam/air interfaces in the graduated cylinders are measured as a function of time to determine the rates of water drainage and foam collapse, respectively for each of the samples. The results are shown in FIGS. 1a and 1b, respectively, It is apparent therein that the rates of water drainage and foam collapse are much greater for a conventional polymer-free foam than a polymer enhanced foam. Thus, this example shows that the polymer enhanced foam is more stable and more viscous than the conventional polymer-free foam.

EXAMPLE 2

A sandpack modeling a sandy soil is flooded with a series of polymer enhanced foam samples, differing only in the foam quality of each sample, to determine the relation between foam quality and apparent viscosity for the polymer enhanced foam of the present invention. The sandpack has a length of 30 cm and a permeability of 150 darcies. All flooding is conducted at 340 kPa constant differential pressure across the sandpack. The polymer enhanced foam propagates at a frontal advance rate of about 150 m/day.

The foam is formulated from $N_2$ and a brine solvent containing a $C_{14-16}$ alpha olefin sulfonate surfactant at a concentration of 2000 ppm and a partially hydrolyzed polyacrylamide at a concentration of 7000 ppm. The partially hydrolyzed polyacrylamide has a molecular weight of 11,000,000 and is 30% hydrolyzed. The results are set forth below in Table 1.

TABLE 1

| FOAM QUALITY (%) | AVERAGE APPARENT VISCOSITY (cp) |
| --- | --- |
| 0 | 150 |
| 57 | 190 |
| 63 | 200 |
| 74 | 210 |
| 80 | 230 |
| 85 | 230 |
| 89 | 240 |
| 93 | 240 |

The results indicate that the performance of the polymer enhanced foam is relatively insensitive to foam quality.

EXAMPLE 3

A sample of a polymer enhanced foam and a sample of a conventional polymer-free foam that is substantially identical in composition to the polymer enhanced foam except for the absence of a polymer component are prepared to compare the effective viscosities of the two foams as a function of foam quality. Both foams are formulated from $N_2$ and a brine solvent having a $C_{14-16}$ alpha olefin sulfonate surfactant dissolved therein at a concentration of 2000 ppm. The brine contains 5800 ppm TDS and has principle constituents in the following concentrations: 560 ppm $Ca^{++}$, 160 ppm $Mg^{++}$, 1500 ppm $Na^+$, 200 ppm $K^+$, 2200 ppm $SO_4^=$, and 1400 $Cl^{31}$.

The polymer enhanced foam additionally contains a partially hydrolyzed polyacrylamide at a concentration of 7,000 ppm. The partially hydrolyzed polyacrylamide has a molecular weight of 11,000,000 and is 30% hydrolyzed.

A sandpack substantially the same as that of Example 2 is flooded with each foam. The polymer enhanced foam sample is flooded at a backpressure of 3060 kPa and a differential pressure of 340 kPa. The polymer enhanced foam propagates at a frontal advance rate of between about 146 and 213 m/day. The conventional foam sample is flooded at atmospheric pressure and a differential pressure of 136 kPa and propagates at a frontal advance rate of between about 335 and 1460 m/day.

Figure 2:
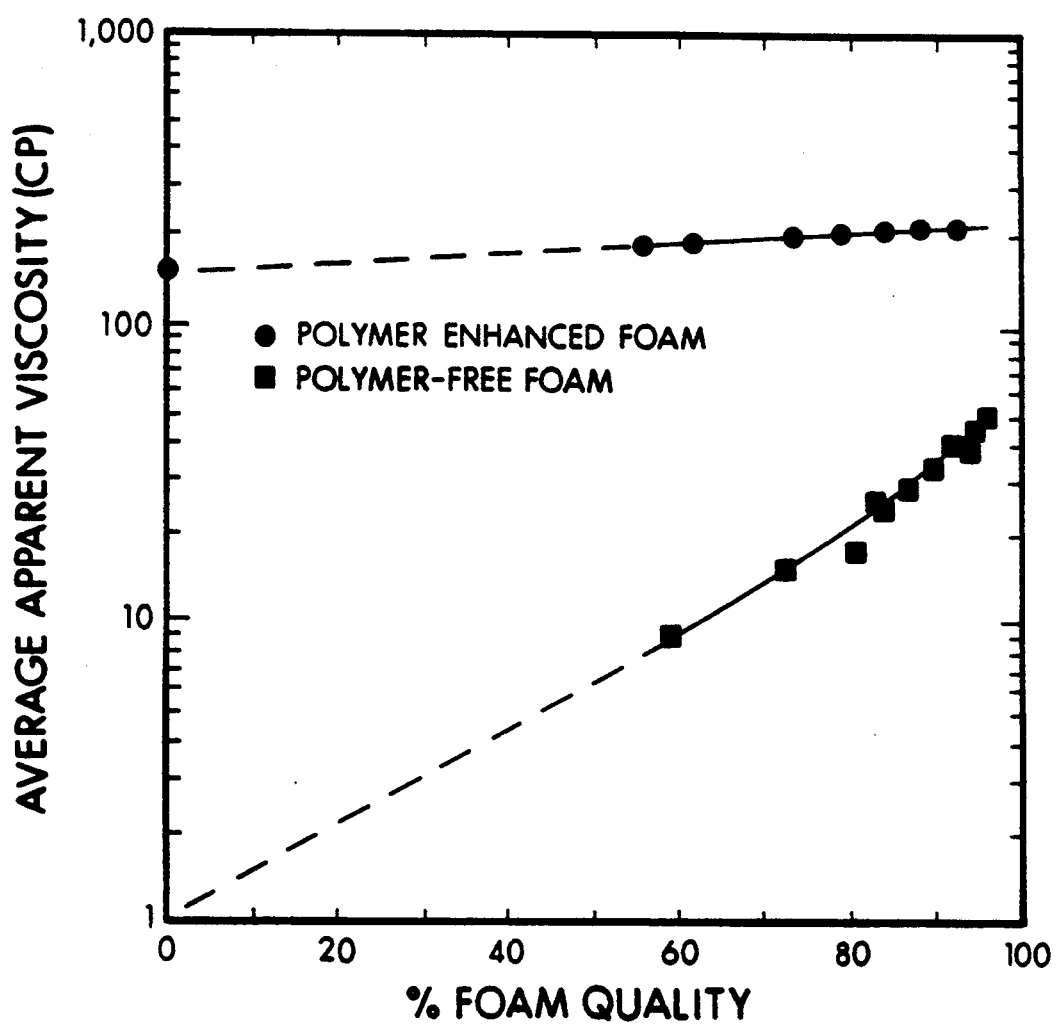
FIG. 2 is a graph comparing foam viscosity as a function of foam quality for a polymer enhanced foam of the present invention and a conventional polymer-free foam as described in Example 3.

The results are set forth in FIG. 2 and indicate that the sensitivity of the polymer enhanced foam viscosity to foam quality is much less than that for the conventional foam. Furthermore, the effective viscosity of the polymer enhanced foam at any given foam quality is much greater than that of the conventional foam. Similar floods performed over a range of absolute pressures show that the viscosity performances of the conventional foam and the polymer enhanced foam remain essentially invariant with absolute test pressure.

EXAMPLE 4

A sandpack modeling sandy soil is flooded with a fully formed polymer enhanced foam sample to determine the critical pressure gradient for foam flow. The composition of the polymer enhanced foam sample is the same as Example 3 and the foam quality is about 85%. The sandpack has a length of 30 cm and a permeability of 140 darcies. The critical pressure gradient for foam flow is determined to be in the range of 1.34 to 1.56 kPa/cm. Normal natural drift pressure gradients for fluids in soils are not expected to approach values of 1.34 kPa/cm suggesting that the polymer enhanced foam is well suited for effectively blocking fluid flow through soil.

EXAMPLE 5

Two separate floods of a sandpack modeling sandy soil are conducted at room temperature with 0.2 pore volumes of a fully formed polymer enhanced foam sample followed by 0.8 pore volumes of a brine. In the first flood the sandpack is flushed with a brine immediately prior to foam injection and the sandpack is initially at 100% brine saturation. In the second flood the sandpack is flushed with a brine, saturated with a Wyoming crude oil, and then flooded with the brine to residual oil saturation immediately prior to foam injection to demonstrate the stability of the polymer enhanced foam in the presence of a hydrocarbon.

The sandpack has a permeability of 150 darcies, a length of 6.1 m and a diameter of 0.46 cm. A constant differential pressure of 680 kPa is applied to the sandpack. The polymer enhanced foam is formulated from $N_2$ and the synthetic injection water brine of Example 4, having a $C_{14-16}$ alpha olefin sulfonate surfactant and a partially hydrolyzed polyacrylamide dissolved therein at concentrations of 2000 ppm and 7000 ppm respectively. The partially hydrolyzed polyacrylamide has a molecular weight of 11,000,000 and is 30% hydrolyzed. The polymer enhanced foam in the first flood has an apparent viscosity of 43 cp after it has propagated almost entirely through the sandpack, while the polymer enhanced foam in the second flood has an apparent viscosity of 50 cp after it has propagated almost entirely through the sandpack. During both floods, the polymer enhanced foam bank was essentially intact after propagating through the entire length of the sandpack. These results suggest that polymer enhanced foam performance is relatively insensitive to liquid hydrocarbons. Thus, the polymer enhanced foam is capable of effectively blocking the undesirable flow of leaking or spilled hydrocarbons through soil.

While the foregoing preferred embodiments of the invention have been described and shown, it is understood that alternatives and modifications, such as those suggested and others, may be made thereto and fall within the scope of the present invention.

I claim:

1. A process for blocking fluid flow in a soil comprising:

placing a polymer enhanced foam in a treatment region of a soil, wherein said foam comprises a substantially uncrosslinked polymer, a surfactant, an aqueous solvent, and a gas, and wherein said foam blocks flow of a migratory fluid in said soil.

2. The process of claim 1 for blocking fluid flow in a soil wherein said foam has a critical pressure gradient for foam flow greater than the natural drift pressure gradient for flow exhibited by said migratory fluid.

3. The process of claim 1 for blocking fluid flow in a soil wherein said migratory fluid is a liquid hydrocarbon.

4. The process of claim 1 for blocking fluid flow in a soil wherein said migratory fluid is an aqueous liquid.

5. The process of claim 1 for blocking fluid flow in a soil wherein said treatment region is a volume of said soil positioned between a fluid contaminated soil and a water source.

6. The process of claim 1 for blocking fluid flow in a soil wherein said treatment region is a volume of said soil positioned substantially adjacent to a building structure.

7. The process of claim 1 for blocking fluid flow in a soil wherein said treatment region is a volume of said soil underlying arable topsoil.

8. The process of claim 1 for blocking fluid flow in a soil wherein said treatment region is a volume of said soil contained within a man-made earthen formation.

9. The process of claim 1 for blocking fluid flow in a soil wherein said foam is placed in said treatment region by displacing said foam into said treatment region after preforming said foam and injecting said foam into said soil.

10. The process of claim 1 for blocking fluid flow in a soil wherein said foam is placed in said treatment region by displacing said foam into said treatment region after forming a solution of said polymer, surfactant, and solvent, sequentially injecting said gas and said solution into said soil, and mixing said gas and said solution to form said foam.

11. The process of claim 1 for blocking fluid flow in a soil wherein said foam is placed in said treatment region by displacing said foam into said treatment region after forming a solution of said polymer, surfactant, and solvent, coinjecting said gas and said solution into said soil, and mixing said gas and said solution to form said foam.

12. The process of claim 1 for blocking fluid flow in a soil further comprising:

premixing said polymer, surfactant and solvent to form a liquid phase and combining said liquid phase with said gas at the surface to formulate said foam; and injecting said foam into said soil.

13. The process of claim 1 for blocking fluid flow in a soil further comprising:

premixing said polymer, surfactant and solvent to form a liquid phase; and coinjecting said liquid phase and said gas into said soil.

14. The process of claim 1 for blocking fluid flow in a soil further comprising:

premixing said polymer, surfactant and solvent to form a liquid phase;

sequentially injecting said liquid phase and said gas into said formation; and combining said liquid phase and said gas in said soil to form said foam.

15. The process of claim 1 for blocking fluid flow in a soil wherein said polymer is an acrylamide polymer.

16. The process of claim 1 for blocking fluid flow in a soil wherein said surfactant is an alpha olefin sulfonate.

17. A process for blocking fluid flow in a soil comprising:

placing a polymer enhanced foam in a treatment region of a soil, wherein said foam comprises a substantially uncrosslinked polymer, a surfactant, an aqueous solvent, and a gas, and further wherein said foam has a critical pressure gradient for foam flow greater than a natural drift pressure gradient for flow exhibited by a migratory fluid in said soil to block flow of said migratory fluid in said soil.

18. A process for blocking fluid flow in a soil comprising:

placing a polymer enhanced foam in a treatment region of a soil, wherein said foam comprises a substantially uncrosslinked polyacrylamide or partially hydrolyzed polyacrylamide, a surfactant, water, and a gas, and wherein said foam blocks flow of a migratory fluid in said soil.

* * * * *